US010392254B2

(12) United States Patent
Yamagishi et al.

(10) Patent No.: US 10,392,254 B2
(45) Date of Patent: Aug. 27, 2019

(54) CARBON FILM AND METHOD FOR PRODUCING THE SAME

(71) Applicant: ZEON CORPORATION, Chiyoda-ku, Tokyo (JP)

(72) Inventors: Tomoko Yamagishi, Tokyo (JP); Mitsugu Uejima, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/560,260

(22) PCT Filed: Mar. 22, 2016

(86) PCT No.: PCT/JP2016/001656
§ 371 (c)(1),
(2) Date: Sep. 21, 2017

(87) PCT Pub. No.: WO2016/157834
PCT Pub. Date: Oct. 6, 2016

(65) Prior Publication Data
US 2018/0065854 A1 Mar. 8, 2018

(30) Foreign Application Priority Data
Mar. 31, 2015 (JP) ................................ 2015-071383

(51) Int. Cl.

| | |
|---|---|
| ***C01B 32/166*** | (2017.01) |
| ***C01B 32/05*** | (2017.01) |
| ***B82Y 30/00*** | (2011.01) |
| ***B82Y 40/00*** | (2011.01) |
| ***H01B 1/04*** | (2006.01) |

(52) U.S. Cl.
CPC ............ *C01B 32/166* (2017.08); *B82Y 30/00* (2013.01); *B82Y 40/00* (2013.01); *C01B 32/05* (2017.08); *H01B 1/04* (2013.01); *C01B 2202/22* (2013.01); *C01B 2202/32* (2013.01)

(58) Field of Classification Search
CPC ............. C01B 32/166; C01B 2202/22; C01B 2202/32; B82Y 30/00; B82Y 40/00; H01B 1/04
See application file for complete search history.

(56) References Cited

U.S. PATENT DOCUMENTS

2008/0318049 A1 12/2008 Hata et al.
2012/0148476 A1* 6/2012 Hata ........................ B01J 23/74 423/447.3
2014/0272596 A1 9/2014 Yamamoto et al.
2016/0159652 A1 6/2016 Uejima et al.
2016/0315331 A1* 10/2016 Yoshiwara .......... H01M 4/8605

FOREIGN PATENT DOCUMENTS

| | | | | |
|---|---|---|---|---|
| CN | 104051736 A | 9/2014 | | |
| EP | 2444370 A1 | 4/2012 | | |
| EP | 2778266 A1 | 9/2014 | | |
| EP | 3028992 A1 | 6/2016 | | |
| EP | 3089247 A1 | 11/2016 | | |
| JP | 2010105909 A | 5/2010 | | |
| JP | 2014177722 A | 9/2014 | | |
| WO | 2006011655 A1 | 2/2006 | | |
| WO | WO 2012/141308 | * 10/2012 | | |
| WO | 2015015758 A1 | 2/2015 | | |
| WO | 2015098089 A1 | 7/2015 | | |
| WO | WO 2015098089 | * 7/2015 | ............. | H01M 4/86 |

OTHER PUBLICATIONS

Machine translation of WO 2012/141308A1.*
Oct. 3, 2017, International Preliminary Report on Patentability issued in the International Patent Application No. PCT/JP2016/001656.
May 17, 2016, International Search Report issued in the International Patent Application No. PCT/JP2016/001656.
Dingshan Yu et al., "Self-Assembled Graphene/Carbon Nanotube Hybrid Films for Supercapacitors", The Journal of Physical Chemistry Letters, Jan. 21, 2010, pp. 467 to 470, vol. 1, No. 2.
Sep. 28, 2018, the Extended European Search Report issued by the European Patent Office in the corresponding European Patent Application No. 16771724.8.

* cited by examiner

*Primary Examiner* — Daniel C. McCracken
(74) *Attorney, Agent, or Firm* — Kenja IP Law PC

(57) ABSTRACT

Provided is a carbon film including: a plurality of fibrous carbon nanostructures; and a conductive carbon, wherein the plurality of fibrous carbon nanostructures has a BET specific surface area of 500 $m^2/g$ or more. Also provided is a method of producing a carbon film, the method including mixing a conductive carbon into a fibrous carbon nanostructure dispersion liquid containing a plurality of fibrous carbon nanostructures having a BET specific surface area of 500 $m^2/g$ or more, a dispersant, and a solvent, and subsequently removing the solvent to form a carbon film.

7 Claims, No Drawings

CARBON FILM AND METHOD FOR PRODUCING THE SAME

TECHNICAL FIELD

The present disclosure relates to a carbon film and a method of producing the same. Especially, the present disclosure relates to a carbon film including a plurality of fibrous carbon nanostructures and conductive carbon and to a method of producing the same.

BACKGROUND

Ever since invented, carbon materials such as conductive carbon have been attracting attention due to their high electrical conductivity and heat conductivity. Above all, sheet-like structures made solely of carbon materials are, due to their characteristics, expected to open up a variety of application possibilities, such as in storage devices.

In recent years, carbon nanotubes (hereinafter, may be called "CNTs") are especially becoming the center of attention as a material having excellent electrical conductivity, heat conductivity, and mechanical characteristics.

However, CNTs are fibrous carbon nanostructures having a nanometer-sized diameter, which makes handling and processing of individual CNTs difficult. In consideration of this, a plurality of CNTs may be aggregated into a film shape to form a carbon nanotube film (hereinafter, may be called a "CNT film"), which is sometimes also referred to as a "buckypaper". Thus formed CNT film is proposed to be used, for example, as a conductive film. More concretely, it has been proposed that a CNT film may be used as a component (e.g., a conductive film or a cathode catalyst layer) of an electrode included in a solar cell, a touch panel, or the like (refer, for example, to Patent Literature 1). The proposed CNT film is formed by removing a solvent from a CNT dispersion liquid containing the solvent and CNTs, by way of filtration, drying, or other methods.

CITATION LIST

Patent Literature

PTL1: Japanese Patent Application Publication No. 2010-105909

SUMMARY

Technical Problem

However, production of fibrous carbon nanostructures such as CNTs, requires advanced technology and high production cost. This implies a very high price of a carbon film formed by using only fibrous carbon nanostructures such as CNTs, as the carbon material. On the other hand, particulate conductive carbon or the like as a carbon material has weak bonding strength to each other. This poses the need for forming the carbon material into a sheet by using a binding agent made of an organic material to ensure the free-standing properties and film-forming properties. However, a carbon film fabricated by such a conventionally-known method does not have electrical conductivity sufficient to allow the carbon film to be used in applications such as a solar cell and a touch panel. Accordingly, there is demand for further improvement in carbon film characteristics.

The present disclosure is therefore to provide a carbon film that contains a conductive carbon different from the fibrous carbon nanostructures such as CNTs, and that also provides excellent free-standing properties and electrical conductivity. The present disclosure is also to provide a method of producing such a carbon film.

Solution to Problem

To achieve the above objective, the present inventors have conducted earnest studies. Then, the present inventors have found that a carbon film having excellent free-standing properties and electrical conductivity is obtained by adding conductive carbon, along with fibrous carbon nanostructures having a predetermined BET specific surface area, to the carbon film.

That is to say, the present disclosure is to solve the above problem, and one of aspects of the present disclosure resides in a carbon film including: a plurality of fibrous carbon nanostructures; and a conductive carbon, wherein the plurality of fibrous carbon nanostructures has a BET specific surface area of 500 $m^2/g$ or more. By thus using the plurality of fibrous carbon nanostructures having a BET specific surface area of 500 $m^2/g$ or more and the conductive carbon, a carbon film is provided which has excellent free-standing properties and electrical conductivity.

In a preferred embodiment of the carbon film according to the present disclosure, a content ratio by mass of the plurality of fibrous carbon nanostructures to the conductive carbon (fibrous carbon nanostructures/conductive carbon) is from 95/5 to 35/65. With the content ratio of the plurality of fibrous carbon nanostructures to the conductive carbon (fibrous carbon nanostructures/conductive carbon) of from 95/5 to 35/65, electrical conductivity of the carbon film is increased, and film-forming properties of the carbon film are also improved.

In another preferred embodiment of the carbon film according to the present disclosure, the plurality of fibrous carbon nanostructures includes one or more carbon nanotubes. Use of the plurality of fibrous carbon nanostructures including the carbon nanotubes further increases strength and free-standing properties of the carbon film.

Another aspect of the present disclosure resides in a method of producing a carbon film, the method including mixing conductive carbon into a fibrous carbon nanostructure dispersion liquid containing a plurality of fibrous carbon nanostructures having a BET specific surface area of 500 $m^2/g$ or more, a dispersant, and a solvent, and subsequently removing the solvent to form a carbon film. By thus mixing the conductive carbon into the fibrous carbon nanostructure dispersion liquid in which the plurality of fibrous carbon nanostructures have been dispersed in advance, and subsequently removing the solvent to form a carbon film, a carbon film is produced that has excellent free-standing properties and electrical conductivity.

In a preferred embodiment of the method of producing a carbon film according to the present disclosure, the method further includes preparing the fibrous carbon nanostructure dispersion liquid by subjecting a coarse dispersion liquid containing the plurality of fibrous carbon nanostructures, the dispersant, and the solvent to dispersion treatment that brings about a cavitation effect or a crushing effect in order to disperse the fibrous carbon nanostructures. By subjecting the coarse dispersion liquid to dispersion treatment that brings about a cavitation effect or a crushing effect, the plurality of fibrous carbon nanostructures are favorably dispersed in the dispersion liquid, and the subsequently conductive carbon and the plurality of fibrous carbon nanostructures are mixed homogenously. The resulting carbon film formed from the homogenous dispersion liquid includes the plurality of fibrous carbon nanostructures and the conductive carbon that are homogeneously dispersed. This further improves carbon film characteristics such as free-standing properties and electrical conductivity.

In another preferred embodiment of the method of producing a carbon film according to the present disclosure, a content ratio by mass of the plurality of fibrous carbon nanostructures to the conductive carbon (fibrous carbon nanostructures/conductive carbon) in the fibrous carbon nanostructure dispersion liquid is from 95/5 to 35/65. With the content ratio of the plurality of fibrous carbon nanostructures to the conductive carbon (fibrous carbon nanostructures/conductive carbon) of from 95/5 to 35/65, a carbon film is produced that has even more excellent electrical conductivity and film-forming properties.

In another preferred embodiment of the method of producing a carbon film according to the present disclosure, the plurality of fibrous carbon nanostructures includes one or more carbon nanotubes. Use of the fibrous carbon nanostructures including the carbon nanotubes further increases strength and free-standing properties of the carbon film.

Advantageous Effect

The present disclosure provides a carbon film that contains the conductive carbon different from the fibrous carbon nanostructures such as CNTs, and that also provides excellent free-standing properties and electrical conductivity. The present disclosure also provides a method of producing the above carbon film.

DETAILED DESCRIPTION

Embodiments of the present disclosure will now be described in detail.

Herein, a carbon film according to the present disclosure includes fibrous carbon nanostructures having a BET specific surface area of 500 $m^2/g$ or more and conductive carbon. The carbon film according to the present disclosure may be produced by a method of producing a carbon film according to the present disclosure.

(Carbon Film)

The carbon film according to the present disclosure includes a fibrous carbon nanostructure aggregate formed by aggregating a plurality of fibrous carbon nanostructures into a film shape. The carbon film according to the present disclosure is characterized in that the fibrous carbon nanostructures constituting the aggregate have a BET specific surface area of 500 $m^2/g$ or more. The carbon film according to the present disclosure is also characterized in that the carbon film includes the conductive carbon different from the fibrous carbon nanostructures.

The presently disclosed carbon film may be a film formed on a support such as a substrate (i.e., a supported film), or may be a free-standing film.

[Fibrous Carbon Nanostructures]

The fibrous carbon nanostructures used in the present disclosure have a BET specific surface area of 500 $m^2/g$ or more. However, the BET specific surface area is preferably 600 $m^2/g$ or more, more preferably 800 $m^2/g$ or more, and most preferably 1000 $m^2/g$ or more. Furthermore, the BET specific surface area is preferably 2500 $m^2/g$ or less, and more preferably 1200 $m^2/g$ or less. Moreover, when the fibrous carbon nanostructures include CNTs, which are mainly open CNTs, it is preferable that the BET specific surface area is 1300 $m^2/g$ or more. When the BET specific surface area of the fibrous carbon nanostructures is 500 $m^2/g$ or more, heat conductivity and strength of the carbon film are sufficiently increased. Furthermore, when the BET specific surface area of the fibrous carbon nanostructures is 2500 $m^2/g$ or less, agglomeration of the fibrous carbon nanostructures is limited, and the dispersibility of the fibrous carbon nanostructures in the carbon film is increased.

As used herein, "BET specific surface area" refers to a nitrogen adsorption specific surface area measured by the BET method.

Herein, the fibrous carbon nanostructures having a BET specific surface area of 500 $m^2/g$ or more may be composed solely of carbon nanotubes (hereinafter, may be called "CNTs") that are cylindrical carbon nanostructures, or, may be mixtures of CNTs and non-cylindrical fibrous carbon nanostructures, such as later-described graphene nanotapes, other than CNTs.

Any type of CNTs may be used in the fibrous carbon nanostructures having a BET specific surface area of 500 $m^2/g$ or more. Examples of the CNTs may include, but not particularly limited to, single-walled carbon nanotubes and/or multi-walled carbon nanotubes, with single- to up to 5-walled carbon nanotubes being preferred and single-walled carbon nanotubes being more preferred. The use of single-walled carbon nanotubes will further improve, as compared to the use of multi-walled carbon nanotubes, electrical conductivity and strength of the carbon film.

The carbon nanotubes may be efficiently produced, for example, by the super growth method (refer to WO2006/011655), wherein during synthesis of CNTs through chemical vapor deposition (CVD) by supplying a feedstock compound and a carrier gas onto a substrate having thereon a catalyst layer for carbon nanotube production, the catalytic activity of the catalyst layer is dramatically improved by providing a trace amount of an oxidizing agent (catalyst activating material) in the system. Hereinafter, carbon nanotubes that are obtained by the super growth method may also be called "SGCNTs".

The carbon nanotubes produced by the super growth method may be composed solely of SGCNTs or may be composed of SGCNTs and non-cylindrical carbon nanostructures.

The fibrous carbon nanostructures may include single- or multi-walled flattened cylindrical carbon nanostructures having over the entire length a tape portion where inner walls are in close proximity to each other or bonded together (hereinafter, such carbon nanostructures may be called "graphene nanotapes [GNTs]").

Herein, GNT is presumed to be a substance having over the entire length a tape portion where inner walls are in close proximity to each other or bonded together since it has been synthesized, and having a network of 6-membered carbon rings in the form of flattened cylindrical shape. The GNT's flattened cylindrical structure and the presence of a tape portion where inner walls are in close proximity to each other or bonded together in the GNT may be confirmed for example as follows. That is to say, GNT and fullerene (C60) are sealed into a quartz tube and subjected to heat treatment under reduced pressure (fullerene insertion treatment) to form a fullerene-inserted GNT, followed by observation under transmission electron microscopy (TEM) of the fullerene-inserted GNT to confirm the presence of part (tape portion) in the GNT where no fullerene is inserted.

The shape of the GNT is preferably such that it has a tape portion at the central part in the width direction. More preferably, the shape of a cross-section of the GNT, perpendicular to the extending direction (axial direction), is such that the maximum dimension in a direction perpendicular to the longitudinal direction of the cross section is larger in the vicinity of opposite ends in the longitudinal direction of the cross section than in the vicinity of the central part in the longitudinal direction of the cross section. Most preferably, a cross-section of the GNT perpendicular to the extending direction (axial direction) has a dumbbell shape.

The term "vicinity of the central part in the longitudinal direction of a cross section" used for the shape of a cross section of GNT refers to a region within 30% of longitudinal dimension of the cross section from the line at the longitudinal center of the cross section (i.e., a line that passes through the longitudinal center of the cross section and is perpendicular to the longitudinal line in the cross section). The term "vicinity of opposite ends in the longitudinal direction of a cross section" refers to regions outside the "vicinity of the central part in the longitudinal direction of a cross section" in the longitudinal direction.

Carbon nanostructures including GNTs as non-cylindrical carbon nanostructures may be obtained by, when synthesizing CNTs by the super growth method using a substrate having thereon a catalyst layer (hereinafter, may be called a "catalyst substrate"), forming the catalyst substrate using a certain method. For example, carbon nanostructures including GNTs may be obtained by the super growth method using a catalyst substrate. The catalyst substrate is prepared by applying coating liquid A containing an aluminum compound on a substrate and dried to form an aluminum thin film (catalyst support layer) on the substrate, followed by application of coating liquid B containing an iron compound on the aluminum thin film and drying of the coating liquid B at a temperature of 50° C. or less to form an iron thin film (catalyst layer) on the aluminum thin film.

The fibrous carbon nanostructures are preferably those having a ratio (3σ/Av) of a standard deviation (σ) of diameters multiplied by 3 (3σ) to average diameter (Av) of greater than 0.20 to less than 0.60, more preferably those having 3σ/Av of greater than 0.25, even more preferably those having 3σ/Av of greater than 0.50. Use of fibrous carbon nanostructures having 3σ/Av of greater than 0.20 to less than 0.60 allows for sufficient increases in heat conductivity and strength of the carbon film even when only a small amount of carbon nanostructures has been blended, thereby limiting rises in hardness (i.e., reductions in flexibility) of the carbon film due to blending of the fibrous carbon nanostructures. The result is that a carbon film may be obtained that has sufficiently high levels of heat conductivity, flexibility, and strength at the same time.

"Average diameter (Av) of fibrous carbon nanostructures" and "standard deviation (σ) (where σ is sample standard deviation) of diameters of fibrous carbon nanostructures" may each be obtained by measuring the diameters (outer diameters) of randomly-selected 100 fibrous carbon nanostructures by using transmission electron microscopy. The average diameter (Av) and standard deviation (σ) of the fibrous carbon nanostructures may be adjusted either by changing the production method and/or the production conditions of the fibrous carbon nanostructures or by combining different types of fibrous carbon nanostructures, prepared by different production methods The fibrous carbon nanostructures that are used typically take a normal distribution when a plot is made of diameter measured as described above on the horizontal axis and the frequency on the vertical axis, and Gaussian approximation is made.

Furthermore, the fibrous carbon nanostructures preferably exhibit a radial breathing mode (RBM) peak when evaluated by Raman spectroscopy. Note that no RBM appears in the Raman spectrum of fibrous carbon nanostructures composed solely of multi-walled carbon nanotubes having three or more walls.

In a Raman spectrum of the fibrous carbon nanostructures, the ratio of G band peak intensity to D band peak intensity (G/D ratio) is preferably at least 1 and not more than 20. G/D ratio of at least 1 and not more than 20 allows for sufficient increases in heat conductivity and strength of the carbon film even when a small amount of fibrous carbon nanostructures has been blended, thereby limiting rises in hardness (i.e., reductions in flexibility) of the carbon film due to blending of the fibrous carbon nanostructures. The result is that a carbon film may be obtained that has sufficiently high levels of heat conductivity, flexibility, and strength at the same time.

The fibrous carbon nanostructures preferably have an average diameter (Av) of 0.5 nm or more, more preferably 1 nm or more, and preferably 15 nm or less, more preferably 10 nm or less. Average diameter (Av) of 0.5 nm or more limits agglomeration of fibrous carbon nanostructures to increase the dispersibility of the carbon nanostructures. Average diameter (Av) of 15 nm or less sufficiently increases heat conductivity and strength of the carbon film.

The fibrous carbon nanostructures preferably have an average length at the time of synthesis of at least 100 μm and not more than 5,000 μm. Fibrous carbon nanostructures having a longer length at the time of synthesis are more susceptible to damage to CNTs by breaking, severing, or the like during dispersing. Accordingly, the average length of the nanostructures at the time of synthesis is preferably 5,000 μm or less.

In accordance with the super growth method, the fibrous carbon nanostructures are obtained, on a substrate having thereon a catalyst layer for carbon nanotube growth, in the form of an aggregate (aligned aggregate) wherein fibrous carbon nanostructures are aligned substantially perpendicularly to the substrate. The mass density of the fibrous carbon nanostructures in the form of such an aggregate is preferably at least 0.002 $g/cm^3$ and not more than 0.2 $g/cm^3$. Mass density of 0.2 $g/cm^3$ or less allows the fibrous carbon nanostructures to be homogeneously dispersed within the carbon film because binding among the fibrous carbon nanostructures is weakened. Mass density of 0.002 $g/cm^3$ or more improves the unity of the fibrous carbon nanostructures, thus preventing the fibrous carbon nanostructures from becoming unbound and making the fibrous carbon nanostructures easier to handle.

The fibrous carbon nanostructures preferably include a plurality of micropores. Especially, the fibrous carbon nanostructures preferably include micropores that have a pore diameter of less than 2 nm. The abundance of these micropores as measured in terms of micropore volume determined by the method described below is preferably 0.40 mL/g or more, more preferably 0.43 mL/g or more, even more preferably 0.45 mL/g or more, with the upper limit being generally on the order of 0.65 mL/g. The presence of such micropores in the fibrous carbon nanostructures limits agglomeration of fibrous carbon nanostructures, so that a carbon film may be obtained that contains fibrous carbon nanostructures highly dispersed therein. Micropore volume can be adjusted, for example, by appropriate alteration of the production method and the production conditions of the fibrous carbon nanostructures.

"Micropore volume (Vp)" may be calculated using Equation (II): $Vp=(V/22414)\times(M/\rho)$ by measuring a nitrogen adsorption and desorption isotherm of the fibrous carbon nanostructures at liquid nitrogen temperature (77 K), with the amount of adsorbed nitrogen at a relative pressure of $P/P0=0.19$ being defined as V. In Equation (II), P is a measured pressure at adsorption equilibrium, and P0 is a saturated vapor pressure of liquid nitrogen at time of measurement. Furthermore, M is a molecular weight of 28.010 of the adsorbate (nitrogen), and ρ is a density of 0.808 g/cm$^3$ of the adsorbate (nitrogen) at 77 K. Micropore volume can be measured for example using BELSORP®-mini (BELSORP is a registered trademark in Japan, other countries, or both) available from Bel Japan Inc.

The fibrous carbon nanostructures preferably exhibit a convex upward shape in a t-plot obtained from an adsorption isotherm. Especially, it is preferred that the fibrous carbon nanostructures have not undergone opening formation treatment as well as exhibit a convex upward shape in a t-plot. The "t-plot" may be obtained by converting relative pressure to average thickness t (nm) of an adsorbed layer of nitrogen gas in an adsorption isotherm of fibrous carbon nanostructures as measured by the nitrogen gas adsorption method. That is to say, an average adsorbed nitrogen gas layer thickness t corresponding to a given relative pressure is calculated from a known standard isotherm of average adsorbed nitrogen gas layer thickness t plotted against relative pressure P/P0 and the relative pressure is converted to the corresponding average adsorbed nitrogen gas layer thickness t to obtain a t-plot for the fibrous carbon nanostructures (t-plot method of de Boer et al.).

The growth of an adsorbed layer of nitrogen gas for materials having pores at the surface is divided into the following processes (1) to (3). The gradient of the t-plot changes according to the processes (1) to (3):

(1) a process in which a single molecular adsorption layer is formed over the entire surface by nitrogen molecules;

(2) a process in which a multi-molecular adsorption layer is formed in accompaniment to capillary condensation filling of pores; and (3) a process in which a multi-molecular adsorption layer is formed on a surface that appears to be non-porous due to the pores being filled by nitrogen.

A t-plot having a convex upward shape shows a straight line crossing the origin in a region in which the average adsorbed nitrogen gas layer thickness t is small. However, as t increases, the plot deviates downward from the straight line. Fibrous carbon nanostructures that exhibit such a t-plot curve have a large internal specific surface area relative to total specific surface area of the fibrous carbon nanostructures, indicating the presence of a large number of openings formed in the carbon nanostructures that constitute the fibrous carbon nanostructures.

The t-plot for the fibrous carbon nanostructures preferably has a bending point in the range of $0.2\leq t$ (nm)$\leq 1.5$, more preferably in the range of $0.45\leq t$ (nm)$\leq 1.5$, and even more preferably in the range of $0.55\leq t$ (nm)$\leq 1.0$.

The "position of the bending point" is an intersection point of an approximate straight line A for the aforementioned process (1) and an approximate straight line B for the aforementioned process (3).

The fibrous carbon nanostructures preferably have a ratio of internal specific surface area S2 to total specific surface area S1 (S2/S1) of at least 0.05 and not more than 0.30, obtained from the t-plot.

The fibrous carbon nanostructures having a BET specific surface area of 500 m$^2$/g or more may have any total specific surface area S1 and any internal specific surface area S2. However, S1 is preferably at least 600 m$^2$/g and not more than 1,400 m$^2$/g, more preferably at least 800 m$^2$/g and not more than 1,200 m$^2$/g. On the other hand, S2 is preferably at least 30 m$^2$/g and not more than 540 m$^2$/g.

Total specific surface area S1 and internal specific surface area S2 of the fibrous carbon nanostructures may be found from the t-plot. In detail, first, total specific surface area S1 may be found from the gradient of an approximate straight line corresponding to the process (1), and external specific surface area S3 may be found from the gradient of an approximate straight line corresponding to the process (3). Internal specific surface area S2 may then be calculated by subtracting external specific surface area S3 from total specific surface area S1.

Measurement of adsorption isotherm, preparation of a t-plot, and calculation of total specific surface area S1 and internal specific surface area S2 based on t-plot analysis for the fibrous carbon nanostructures may be made using, for example, BELSORP®-mini (BELSORP is a registered trademark in Japan, other countries, or both), a commercially available measurement instrument available from Bel Japan Inc.

—Conductive Carbon—

The conductive carbon used in the present disclosure is different from the aforementioned fibrous carbon nanostructures having a BET specific surface area of 500 m$^2$/g or more. That is to say, the conductive carbon used in the present disclosure may be a conductive carbon different from the fibrous carbon nanostructures, such as carbon particles of expanded graphite, carbon black, activated carbon, coke, natural graphite, artificial graphite, or the like, carbon nanohorns, and carbon nanofibers. In the present disclosure, by combining the fibrous carbon nanostructures having a BET specific surface area of 500 m$^2$/g or more with the conductive carbon different from the fibrous carbon nanostructures, a carbon film that has excellent free-standing properties and electrical conductivity is obtained.

Use of expanded graphite or carbon black as the conductive carbon is especially preferable from a viewpoint of improving electrical conductivity. Expanded graphite may be obtained, for example, by thermal expansion of expandable graphite which has been obtained by chemical treatment of graphite such as flake graphite with sulfuric acid or the like, followed by micronization. Examples of expandable graphite may include EC1500, EC1000, EC500, EC300, EC100, and EC50 (all trade names) available from Ito Graphite Co., Ltd. Use of expanded graphite as the conductive carbon also improves heat conductivity. Examples of carbon black may include Ketjen black, acetylene black, BLACK PEARLS, and VULCAN. Use of Ketjen black as the conductive carbon is especially preferable from a viewpoint of obtaining excellent electrical conductivity and durability, whereas use of acetylene black as the conductive carbon is especially preferable from a viewpoint of corrosion resistance. Acetylene black has excellent corrosion resistance because the fine crystal structure of particles develops into a graphitic shape and the carbon content is high compared to other types of carbon black.

No specific limitations are placed on the production method for the conductive carbon, which may be produced by a commonly-used method.

Although no specific limitations are placed on the particle size of the conductive carbon, from a viewpoint of controlling the thickness of the carbon film to an appropriate range, an average primary particle diameter of the conductive carbon is preferably 5 nm or more, more preferably 10 nm or more, and is preferably 200 nm or less, more preferably 100 nm or less, even more preferably 50 nm or less, and especially preferably 30 nm or less.

Furthermore, heat-treated carbon black may be used as the conductive carbon. As a result, conductive carbon may be obtained that has not only excellent electrical conductivity, but also excellent corrosion resistance. Heat-treated carbon black as described above has a G band half width of preferably 55 $cm^{-1}$ or less, more preferably 52 $cm^{-1}$ or less, and especially preferably 49 $cm^{-1}$ or less in a Raman spectrum. The higher the crystallinity of the conductive carbon, the more similar a three-dimensional crystal lattice thereof is to a graphitic structure. A small G band half width indicates that carbon with high crystallinity, excellent corrosion resistance, and low impurity content is obtained.

Herein, the Raman spectrum is a spectrum that indicates which wavelengths of light are scattered with what intensities according to the Raman effect. In the present disclosure, the Raman spectrum is expressed with the wavenumber ($cm^{-1}$) on one axis and the intensity on the other axis, and may be used to calculate the G band half width. The term "G band" refers to a peak indicating carbon crystallinity that appears near 1580 $cm^{-1}$ in a spectrum obtained through Raman measurement of carbon particles. Furthermore, the term "half width" refers to the width over which a specific absorption band spreads at half the height of a peak height in the absorption band and is a value used to judge a distribution state of the specific absorption band.

Raman measurement of the conductive carbon may be performed using a commonly known Raman spectrometer. No specific limitations are placed on the Raman spectrometer other than enabling G band measurement with a certain level of reproducibility. However, in a situation in which there is disparity in the shape or position of the G band depending on the Raman spectrometer that is used, a Raman spectrum measured using a specific microscopic laser Raman spectrometer (Holo Lab 5000R available from Kaiser Optical System Inc.) under specific measurement conditions (excitation wavelength: 532 nm; output: 3 mW; measurement time: 30 s exposure×5 integrations) is used as a reference spectrum.

Note that in a situation in which another absorption band is present near the G band and it is not easy to visually determine the half width from the spectrum due to joining of the G band with the other absorption band, the half width can normally be determined using analytical software accompanying the Raman spectrometer. For example, the half width may be determined through processing in which a straight base line is drawn in a region in which the G band peak is included, Lorentz wave shape curve fitting is implemented, and G band peak separation is performed.

Heat-treated carbon black having a G band half width of 55 $cm^{-1}$ or less may be obtained by heat treating the carbon black described above at a high temperature of approximately from 1500° C. to 3000° C. Although no specific limitations are placed on the heat treatment time, an approximate time of from 1 hour to 10 hours is sufficient.

Especially when acetylene black is used as the conductive carbon, the half width of a G band obtained from a Raman spectrum is preferably 55 $cm^{-1}$ or less, more preferably 52 $cm^{-1}$ or less, and especially preferably 49 $cm^{-1}$ or less from a viewpoint of improving corrosion resistance.

—Content Ratio of Fibrous Carbon Nanostructure and Conductive Carbon—

The carbon film according to the present disclosure includes the fibrous carbon nanostructures having a BET specific surface area of 500 $m^2/g$ or more and the conductive carbon different from the fibrous carbon nanostructures. Furthermore, in the presently disclosed carbon film, a content ratio by mass of the fibrous carbon nanostructures having a BET specific surface area of 500 $m^2/g$ or more to the conductive carbon (fibrous carbon nanostructures/conductive carbon) is preferably from 95/5 to 35/65 and more preferably from 90/10 to 40/60. When the content ratio of the fibrous carbon nanostructures having a BET specific surface area of 500 $m^2/g$ or more to the conductive carbon is in the above range, electrical conductivity of the carbon film is further increased, and film-forming properties of the carbon film are also improved.

Properties of Carbon Film

Since including the fibrous carbon nanostructures having a BET specific surface area of 500 $m^2/g$ or more and the conductive carbon as described above, the presently disclosed carbon film has excellent film-forming properties, free-standing properties, and electrical conductivity.

A possible but still uncertain reason why the carbon film, which includes the fibrous carbon nanostructures having a BET specific surface area of 500 $m^2/g$ or more and the conductive carbon, has excellent free-standing properties and electrical conductivity, appears that a porous network having highly advanced networks is formed due to the included fibrous carbon nanostructures and conductive carbon.

Herein, it is preferable that the presently disclosed carbon film further has the following properties.

<Electrical Conductivity>

The presently disclosed carbon film preferably has electrical conductivity that allows the carbon film to be used as a conductive film in a solar cell and a touch panel. In detail, the carbon film has a surface resistivity of preferably 10 Ω/sq. or less, more preferably 5 Ω/sq. or less, and even more preferably 3.5 Ω/sq. or less. Surface resistivity of 10 Ω/sq. or less provides electrical conductivity that allows the carbon film to be sufficiently used as a conductive film in a solar cell and a touch panel.

Additionally, surface resistivity of the carbon film may be measured according to the four-terminal four-probe method. Furthermore, surface resistivity of the carbon film may be adjusted, for example, by altering the type and amount of the fibrous carbon nanostructures, the type of the conductive carbon, and the content ratio of the fibrous carbon nanostructures and the conductive carbon.

[Content Ratio of Fibrous Carbon Nanostructures and Conductive Carbon]

The presently disclosed carbon film is preferably composed of 75 mass % or more of the fibrous carbon nanostructures and the conductive carbon and more preferably does not include other components besides incidental impurities that are mixed in during production. The reason for this is that when the content of the fibrous carbon nanostructures and the conductive carbon is 75 mass % or more, characteristics such as electrical conductivity, heat conductivity, and mechanical characteristics are sufficiently improved.

[Glossiness]

The film surface glossiness at 60° of the presently disclosed carbon film is preferably 5 or more, more preferably 10 or more, and even more preferably 15 or more, and is preferably 50 or less, more preferably 40 or less.

The glossiness of the carbon film may be measured in accordance with JIS Z8741 at an incident angle of 60°. The glossiness of the carbon film may be adjusted, for example, by altering the type and amount of the fibrous carbon nanostructures used to form the carbon film, and the preparation method of a fibrous carbon nanostructure dispersion liquid used to form the carbon film.

[Density]

The density of the presently disclosed carbon film is preferably 0.4 g/$cm^3$ or more, more preferably 0.6 g/$cm^3$ or more, and is preferably 1.0 g/$cm^3$ or less.

In the present disclosure, the density of the carbon film may be determined by measuring the mass, area, and thickness of the carbon film, and then dividing the mass of the carbon film by the volume of the carbon film.

[Free-Standing Ability]

The presently disclosed carbon film is preferably a free-standing film that is capable of maintaining the shape as a film even when a support is not present. In detail, it is more preferable that the presently disclosed carbon film may maintain the shape as a film without a support when the size thereof is from 10 nm to 500 μm in thickness and from 1 $mm^2$ to 100 $cm^2$ in area.

(Method of Producing Carbon Film)

The presently disclosed method of producing a carbon film may be used to produce the presently disclosed carbon film described above. The presently disclosed method of producing a carbon film is characterized by a step (film forming step) of mixing conductive carbon into a fibrous carbon nanostructure dispersion liquid containing fibrous carbon nanostructures having a BET specific surface area of 500 $m^2$/g or more, a dispersant, and a solvent, and subsequently removing the solvent to form a carbon film. The presently disclosed method of a producing a carbon film may further include, prior to the film formation step, a step (dispersion liquid preparation step) of preparing the fibrous carbon nanostructure dispersion liquid by subjecting a coarse dispersion liquid containing the fibrous carbon nanostructures, the dispersant, and the solvent to dispersion treatment.

A carbon film obtained through the presently disclosed method of producing a carbon film has excellent free-standing properties and electrical conductivity as a result of the carbon film including the fibrous carbon nanostructures having a BET specific surface area of 500 $m^2$/g or more and the conductive carbon.

<Dispersion Liquid Preparation Step>

In the dispersion liquid preparation step, the fibrous carbon nanostructure dispersion liquid is preferably prepared by subjecting a coarse dispersion liquid containing the fibrous carbon nanostructures, the dispersant, and the solvent to dispersion treatment that brings about a cavitation effect or a crushing effect in order to disperse the fibrous carbon nanostructures. The reason for this is that a fibrous carbon nanostructure dispersion liquid in which fibrous carbon nanostructures are favorably dispersed may be obtained by using dispersion treatment that brings about a cavitation effect or a crushing effect. Furthermore, when a carbon film is produced using the fibrous carbon nanostructure dispersion liquid in which the fibrous carbon nanostructures are favorably dispersed, the fibrous carbon nanostructures having excellent characteristics may be caused to uniformly assemble so that the resultant carbon film has excellent characteristics such as electrical conductivity, thermal conductivity, and mechanical characteristics.

The fibrous carbon nanostructure dispersion liquid used in the presently disclosed method of producing a carbon film may alternatively be prepared by dispersing the fibrous carbon nanostructures in the solvent using a known dispersion treatment method other than that described above. Moreover, known additives such as fillers, stabilizers, colorants, charge control agents, and lubricants may be blended into the fibrous carbon nanostructure dispersion liquid depending on the intended use of the produced carbon film.

[Fibrous Carbon Nanostructures]

The fibrous carbon nanostructures used to prepare the fibrous carbon nanostructure dispersion liquid may be the previously described fibrous carbon nanostructures having a BET specific surface area of 500 $m^2$/g or more. The fibrous carbon nanostructures may be composed solely of CNTs as cylindrical carbon nanostructures or may be mixtures of CNTs and non-cylindrical fibrous carbon nanostructures, such as GNTs, different from CNTs.

[Dispersant]

No specific limitations are placed on the dispersant used to prepare the fibrous carbon nanostructure dispersion liquid other than being a dispersant that may disperse the fibrous carbon nanostructures and that is soluble in the solvent described further below. The dispersant may be a surfactant, a synthetic polymer, or a natural polymer.

Examples of surfactants may include sodium dodecylsulfonate, sodium deoxycholate, sodium cholate, and sodium dodecylbenzenesulfonate.

Examples of synthetic polymers may include polyether diols, polyester diols, polycarbonate diols, polyvinyl alcohols, partially saponified polyvinyl alcohols, acetoacetyl group-modified polyvinyl alcohols, acetal group-modified polyvinyl alcohols, butyral group-modified polyvinyl alcohols, silanol group-modified polyvinyl alcohols, ethylene-vinyl alcohol copolymers, ethylene-vinyl alcohol-vinyl acetate copolymer resins, dimethylaminoethyl acrylates, dimethylaminoethyl methacrylates, acrylic resins, epoxy resins, modified epoxy resins, phenoxy resins, modified phenoxy resins, phenoxyether resins, phenoxyester resins, fluorine-containing resins, melamine resins, alkyd resins, phenolic resins, polyacrylamides, polyacrylic acids, polystyrene sulfonic acids, polyethylene glycols, and polyvinyl pyrrolidones.

Furthermore, examples of natural polymers may include polysaccharides such as starch, pullulan, dextran, dextrin, guar gum, xanthan gum, amylose, amylopectin, alginic acid, gum arabic, carrageenan, chondroitin sulfate, hyaluronic acid, curdlan, chitin, chitosan, and cellulose, and salts and derivatives thereof. The term derivatives refers to conventionally known compounds such as esters and ethers.

Any one of these dispersants may be used alone, or two or more of these dispersants may be used as a mixture. From among such examples, the dispersant is preferably a surfactant, and is particularly preferably sodium deoxycholate or like, due to such dispersants exhibiting excellent dispersing ability toward the fibrous carbon nanostructures.

[Solvent]

No specific limitations are placed on the solvent of the fibrous carbon nanostructure dispersion liquid. The solvent may, for example, be water; an alcohol such as methanol, ethanol, n-propanol, isopropanol, n-butanol, isobutanol, t-butanol, pentanol, hexanol, heptanol, octanol, nonanol, decanol, or amyl alcohol; a ketone such as acetone, methyl ethyl ketone, or cyclohexanone; an ester such as ethyl acetate or butyl acetate; an ether such as diethyl ether, dioxane, or tetrahydrofuran; an amide-based polar organic solvent such as N,N-dimethylformamide or N-methylpyrrolidone; or an aromatic hydrocarbon such as toluene, xylene, chlorobenzene, ortho-dichlorobenzene, or para-dichlorobenzene. Any one of these solvents may be used alone, or two or more of these solvents may be used as a mixture.

[Dispersion Treatment]

In the dispersion liquid preparation step, a fibrous carbon nanostructure dispersion liquid is prepared by adding, to the solvent as described above, the fibrous carbon nanostructures and the dispersant described earlier to disperse the fibrous carbon nanostructures. The dispersion treatment may employ known mixing method and dispersion method that are described later. Although no specific limitations are placed, the presently disclosed production method preferably prepares the fibrous carbon nanostructure dispersion liquid by conducting dispersion treatment that brings about a cavitation effect or a crushing effect. Such dispersion treatment is described in detail below. The reason is that preparing the fibrous carbon nanostructure dispersion liquid in which the fibrous carbon nanostructures are even more homogenously dispersed allows the fibrous carbon nanostructures and the conductive carbon to be homogeneously dispersed with respect to each other in the subsequent process of mixing the conductive carbon to the fibrous carbon nanostructure dispersion liquid.

[[Dispersion Treatment That Brings About Cavitation Effect]]

The dispersion treatment that brings about a cavitation effect is a dispersion method that utilizes shock waves caused by the rupture of vacuum bubbles formed in water when high energy is applied to the liquid. This dispersion method may be used to favorably disperse the fibrous carbon nanostructures.

Herein, concrete examples of dispersion treatments that bring about a cavitation effect may include dispersion treatment using ultrasound, dispersion treatment using a jet mill, and dispersion treatment using high-shear stirring. One of these dispersion treatments may be carried out or a plurality of these dispersion treatments may be carried out in combination. More concretely, an ultrasonic homogenizer, a jet mill, or a high-shear stirring device may for example be suitably used. Conventionally known devices may be used as the aforementioned devices.

In a situation in which the fibrous carbon nanostructures are dispersed using an ultrasonic homogenizer, the coarse dispersion liquid is irradiated with ultrasound by the ultrasonic homogenizer. The irradiation time may be set as appropriate in consideration of the amount of the fibrous carbon nanostructures and so forth. For example, the irradiation time is preferably 3 minutes or more, more preferably 30 minutes or more, and is preferably 5 hours or less, more preferably 2 hours or less. Furthermore, the power is, for example, preferably at least 20 W and not more than 500 W, and is more preferably at least 100 W and not more than 500 W. The temperature is, for example, preferably at least 15° C. and not more than 50° C.

In a situation in which a jet mill is used, the number of treatment repetitions carried out may be set as appropriate in consideration of the amount of the fibrous carbon nanostructures and so forth. The number of treatment repetitions is, for example, preferably 2 repetitions or more, more preferably 5 repetitions or more, and is preferably 100 repetitions or less, more preferably 50 repetitions or less. Furthermore, the pressure is, for example, preferably at least 20 MPa and not more than 250 MPa, and the temperature is, for example, preferably at least 15° C. and not more than 50° C.

In a situation in which high-shear stirring is used, the coarse dispersion liquid is subjected to stirring and shearing using a high-shear stirring device. The rotational speed is preferably as fast as possible. Furthermore, the operating time (i.e., the time that the device is rotating) is, for example, preferably at least 3 minutes and not more than 4 hours, the circumferential speed is, for example, preferably at least 5 m/s and not more than 50 m/s, and the temperature is, for example, preferably at least 15° C. and not more than 50° C.

It is to be noted that the above-described dispersion treatment that brings about a cavitation effect is more preferably carried out at a temperature of 50° C. or less. The reason for this is in order to suppress change in concentration that occurs due to volatilization of the solvent.

[[Dispersion Treatment That Brings About Crushing Effect]]

Dispersion treatment that brings about a crushing effect is even more beneficial because, in addition to of course enabling uniform dispersion of the fibrous carbon nanostructures in the solvent, dispersion treatment that brings about a crushing effect reduces damage to the fibrous carbon nanostructures due to shock waves when air bubbles burst compared to dispersion treatment that brings about a cavitation effect.

The dispersion treatment that brings about a crushing effect uniformly disperses the fibrous carbon nanostructures in the solvent by causing crushing and dispersion of fibrous carbon nanostructure agglomerates by imparting shear force on the coarse dispersion liquid and by further applying back pressure to the coarse dispersion liquid, while cooling the coarse dispersion liquid as necessary in order to reduce air bubble formation.

When applying back pressure to the coarse dispersion liquid, although the back pressure applied to the coarse dispersion liquid may be lowered at once to atmospheric pressure, the pressure is preferably lowered over multiple steps.

Herein, in order to impart shear force on the coarse dispersion liquid and achieve further dispersion of the fibrous carbon nanostructures, a dispersing system may for example be used that includes a disperser having a configuration such as described below.

That is to say, the disperser includes, in order toward an outflow-side from an inflow-side for the coarse dispersion liquid, a disperser orifice having an inner diameter d1, a dispersion space having an inner diameter d2, and a termination section having an inner diameter d3 (where d2>d3>d1).

In this disperser, when the in-flowing coarse dispersion liquid passes through the disperser orifice at high pressure (for example, from 10 MPa to 400 MPa, and preferably from 50 MPa to 250 MPa), the coarse dispersion liquid is reduced in pressure while becoming a high-flow rate fluid that then flows into the dispersion space. Thereafter, the high-flow rate coarse dispersion liquid that has flowed into the dispersion space flows at high speed inside the dispersion space while receiving shear force. As a result, the flow rate of the coarse dispersion liquid decreases and the fibrous carbon nanostructures are favorably dispersed. A fluid at a lower pressure (back pressure) than the pressure of the in-flowing coarse dispersion liquid then flows out from the terminal section as a fibrous carbon nanostructure dispersion liquid.

Note that the back pressure may be applied on the coarse dispersion liquid by applying a load to flow of the coarse dispersion liquid. For example, a desired back pressure may be applied on the coarse dispersion liquid by providing a multi-step pressure reducer downstream of the disperser.

As a result of the back pressure of the coarse dispersion liquid being reduced over multiple steps by the multi-step pressure reducer, air bubble formation in the fibrous carbon nanostructure dispersion liquid may be reduced when the fibrous carbon nanostructure dispersion liquid is finally exposed to atmospheric pressure.

The disperser may be provided with a heat exchanger or a cooling liquid supply mechanism for cooling the coarse dispersion liquid. The reason for this is that by cooling the coarse dispersion liquid that is at a high temperature due to the application of shear force in the disperser, air bubble formation in the coarse dispersion liquid may be further reduced.

Air bubble formation in the solvent containing the fibrous carbon nanostructures may also be reduced by cooling the coarse dispersion liquid in advance, instead of by providing a heat exchanger or the like.

As explained above, the dispersion treatment that brings about a crushing effect reduces occurrence of cavitation and therefore restricts damage to the fibrous carbon nanostructures caused by cavitation, and especially damage to the fibrous carbon nanostructures caused by shock waves when air bubbles burst, which may be a concern in some cases. Additionally, adhesion of air bubbles to the fibrous carbon nanotubes and energy loss due to air bubble formation are reduced, and the fibrous carbon nanostructures are uniformly and efficiently dispersed.

One example of a dispersing system having a configuration such as described above is BERYU SYSTEM PRO (trade name), available from Beryu Corp. The dispersion treatment that brings about a crushing effect may be implemented using a dispersing system such as described above by controlling dispersing conditions as appropriate.

[Viscosity of Fibrous Carbon Nanostructure Dispersion Liquid]

The viscosity of the fibrous carbon nanostructure dispersion liquid is preferably 0.001 Pa·s or more, more preferably 0.01 Pa·s or more, and is preferably 0.8 Pa·s or less, more preferably 0.6 Pa·s or less. The reason for this is that when the viscosity of the fibrous carbon nanostructure dispersion liquid is at least 0.001 Pa·s and not more than 0.8 Pa·s, the fibrous carbon nanostructures having a BET specific surface area of 500 $m^2/g$ or more and the conductive carbon may be favorably formed into a film in the film formation step described below. Furthermore, characteristics, such as electrical conductivity, thermal conductivity, and mechanical characteristics, of the obtained carbon film may be sufficiently improved, and the carbon film may be easily produced. The viscosity of the fibrous carbon nanostructure dispersion liquid may, for example, be adjusted by altering the blending amount or type of the fibrous carbon nanostructures and the dispersant.

In the present disclosure, the viscosity of the fibrous carbon nanostructure dispersion liquid may be measured in accordance with JIS K7117-1 using a B-type viscometer, with a temperature of 23° C., an M4 rotor, and a rotational speed of 60 rpm.

<Film Forming Step>

In the film forming step, the conductive carbon is mixed into the aforementioned fibrous carbon nanostructure dispersion liquid, and subsequently, the solvent is removed to form a carbon film. By preparing the fibrous carbon nanostructure dispersion liquid in advance and subsequently mixing the conductive carbon into the prepared dispersion liquid, the conductive carbon is mixed into the dispersion liquid in which the fibrous carbon nanostructures are sufficiently homogenously dispersed. As a result, a carbon film is formed in which the fibrous carbon nanostructures and the conductive carbon are homogeneously dispersed with respect to each other.

[Conductive Carbon]

As described earlier, the conductive carbon mixed into the fibrous carbon nanostructure dispersion liquid is conductive carbon different from the fibrous carbon nanostructures having a BET specific surface area of 500 $m^2/g$ or more. The conductive carbon may be the conductive carbon different from the fibrous carbon nanostructures, such as carbon particles of expanded graphite, carbon black, activated carbon, coke, natural graphite, artificial graphite, or the like, carbon nanohorns, and carbon nanofibers as described above. From a viewpoint of improving electrical conductivity, expanded graphite or carbon black is preferably used as the conductive carbon.

—Content Ratio of Fibrous Carbon Nanostructure and Conductive Carbon in Dispersion Liquid—

In the fibrous carbon nanostructure dispersion liquid, a content ratio by mass of the fibrous carbon nanostructures having a BET specific surface area of 500 $m^2/g$ or more to the conductive carbon (fibrous carbon nanostructures/conductive carbon) is preferably from 95/5 to 35/65 and more preferably from 90/10 to 40/60. When the content ratio of the fibrous carbon nanostructures having a BET specific surface area of 500 $m^2/g$ or more to the conductive carbon is in the above range, a carbon film is produced in which electrical conductivity is further increased and in which film-forming properties are also improved.

[Mixing of Conductive Carbon]

The aforementioned conductive carbon is mixed into the aforementioned fibrous carbon nanostructure dispersion liquid and dispersed. The mixing treatment and dispersing treatment may be performed by commonly known methods. The commonly know methods may include a method using a nanomizer, an ultimizer, an ultrasonic disperser, a ball mill, a sand grinder, a dyno-mill, a spike mill, a DCP mill, a basket mill, a paint conditioner, a homogenizer, a high-shear stirring device (e.g., trade name FILMIX® [FILMIX is a registered trademark in Japan, other countries, or both], available from Primix Corporation), or a high-speed stirring device.

[Solvent Removal]

From the fibrous carbon nanostructure dispersion liquid in which the conductive carbon is mixed, the solvent is removed according to, for example, one of the following methods (A) and (B) to form a carbon film.

(A) A method involving applying the fibrous carbon nanostructure dispersion liquid onto a film formation substrate and subsequently drying the applied fibrous carbon nanostructure dispersion liquid.

(B) A method involving filtering the fibrous carbon nanostructure dispersion liquid using a film formation substrate that is porous and then drying the resultant residue.

Since the presently disclosed method of producing a carbon film forms the fibrous carbon nanostructures having a BET specific surface area of 500 $m^2/g$ or more and the conductive carbon into a film, a porous network having highly advanced networks is formed. This may be the reason why the presently disclosed method provides a carbon film that has excellent free-standing properties and electrical conductivity.

[Film Formation Substrate]

Examples of the film formation substrate may include, but is not particularly limited to, any known substrate used in accordance with the intended use of the carbon film to be produced.

Concrete examples of the film formation substrate onto which the fibrous carbon nanostructure dispersion liquid is applied in the method (A) may include a resin substrate and a glass substrate. Examples of resin substrates may include substrates made of polyethylene terephthalate (PET), polyethylene naphthalate (PEN), polytetrafluoroethylene (PTFE), polyimides, polyphenylene sulfide, aramids, polypropylene, polyethylene, polylactic acid, polyvinyl chloride, polycarbonates, polymethyl methacrylate, alicyclic acrylic resins, cycloolefin resins, and triacetyl cellulose. Examples of glass substrates may include a substrate made of normal soda glass.

Examples of the film formation substrate used to filter the fibrous carbon nanostructure dispersion liquid in the method (B) may include filter paper and porous sheets made of cellulose, nitrocellulose, alumina, and the like.

[Application]

In the method (A), the fibrous carbon nanostructure dispersion liquid may be applied onto the film formation substrate by any known application method. Concrete examples of application methods that may be used include dipping, roll coating, gravure coating, knife coating, air knife coating, roll knife coating, die coating, screen printing, spray coating, and gravure offset.

[Filtration]

In the method (B), the fibrous carbon nanostructure dispersion liquid may be filtered by the film formation substrate by any known filtration method. Concrete examples of filtration methods that may be used include natural filtration, vacuum filtration, pressure filtration, and centrifugal filtration.

[Drying]

The fibrous carbon nanostructure dispersion liquid applied onto the film formation substrate in the method (A) or the residue obtained in the method (B) may be dried by any known drying method. Examples of drying methods may include hot-air drying, vacuum drying, hot-roll drying, and infrared irradiation. Although no specific limitations are placed on the drying temperature and time, the drying temperature is normally from room temperature to 200° C., and the drying time is normally from 0.1 minutes to 150 minutes.

<Post-Formation Treatment of Carbon Film>

A carbon film formed in the manner described above normally contains components of the fibrous carbon nanostructure dispersion liquid, such as the fibrous carbon nanostructures, the conductive carbon, and the dispersant, in the same ratio as these components are contained in the fibrous carbon nanostructure dispersion liquid. Accordingly, the presently disclosed method of producing a carbon film may optionally include washing the carbon film formed in the film formation step to remove the dispersant from the carbon film. Removal of the dispersant from the carbon film enables further improvement of carbon film characteristics such as electrical conductivity.

The washing of the carbon film may be performed by bringing the carbon film into contact with a solvent that may dissolve the dispersant and causing the dispersant in the carbon film to elute into the solvent. No specific limitations are placed on the solvent that may dissolve the dispersant in the carbon film. For example, any of the previously described solvents that may be used as the solvent of the fibrous carbon nanostructure dispersion liquid may be used, and preferably the same solvent as the solvent of the fibrous carbon nanostructure dispersion liquid is used. The carbon film may be brought into contact with the solvent by immersing the carbon film in the solvent or applying the solvent onto the carbon film. Moreover, the carbon film resulting from this washing may be dried by a known method.

Furthermore, the presently disclosed method of producing a carbon film may optionally include subjecting the carbon film formed in the film formation step to pressing in order to further increase the density of the carbon film. From a viewpoint of reducing deterioration of properties due to damage or destruction of the fibrous carbon nanostructures, it is preferable that pressing is performed with a pressing pressure of less than 3 MPa, and more preferable that pressing is not performed.

(Intended Use of Carbon Film)

The presently disclosed carbon film is especially suitable as a conductive film for a solar cell, a touch panel, or the like.

The presently disclosed carbon film may be used as formed on the film formation substrate or may be used after being peeled from the film formation substrate. Note that the presently disclosed carbon film may optionally be stacked with a known functional layer, such as an overcoating layer, and then be used in various products. Stacking of a functional layer, such as an overcoating layer, on the carbon film may be performed by a known method.

<Touch Panel>

In an example, the presently disclosed carbon film may be suitably used as a conductive layer that is formed on a transparent substrate and that constitutes a touch sensor of a touch panel, such as a capacitive touch panel.

<Solar Cell>

In another example, the presently disclosed carbon film may be used as a conductive layer or catalyst layer that constitutes an electrode of a solar cell, such as a dye-sensitized solar cell. More concretely, the presently disclosed carbon film may be used as a conductive layer constituting a photoelectrode of a dye-sensitized solar cell, or as a conductive layer and/or a catalyst layer constituting a counter electrode (catalyst electrode) of a dye-sensitized solar cell.

EXAMPLES

Hereinafter, the present disclosure will be described in detail with reference to Examples. However, the present disclosure is not limited to these Examples.

<Synthesis of Fibrous Carbon Nanostructures>

Fibrous carbon nanostructures were synthesized according to the following procedure.

A coating liquid A for catalyst supporting layer formation was prepared by dissolving 1.9 g of aluminum tri-sec-butoxide, used as an aluminum compound, in 100 mL of 2-propanol, used as an organic solvent, and further adding and dissolving 0.9 g of triisopropanolamine, used as a stabilizer.

Additionally, a coating liquid B for catalyst layer formation was prepared by dissolving 174 mg of iron acetate, used as an iron compound, in 100 mL of 2-propanol, used as an organic solvent, and further adding and dissolving 190 mg of triisopropanolamine, used as a stabilizer.

The coating liquid A described above was applied onto the surface of an Fe—Cr alloy SUS430 base plate (available from JFE Steel Corporation, 40 mm×100 mm, thickness 0.3 mm, Cr 18%, arithmetic average roughness Ra approximately 0.59 μm), used as a substrate, by dip coating under ambient conditions of a room temperature of 25° C. and a relative humidity of 50%. In detail, the substrate was immersed in the coating liquid A and was held in the coating liquid A for 20 s before being pulled up with a pulling-up speed of 10 mm/s. Thereafter, air drying was performed for 5 minutes, heating at a temperature of 300° C. in an air environment was performed for 30 minutes, and cooling was performed to room temperature to form an alumina thin film (catalyst supporting layer) of 40 nm in thickness on the substrate.

Next, the coating liquid B described above was applied onto the alumina thin film on the substrate by dip coating under ambient conditions of a room temperature of 25° C. and a relative humidity of 50%. In detail, the substrate having the alumina thin film thereon was immersed in the coating liquid B and was held in the coating liquid B for 20 s before being pulled up with a pulling-up speed of 3 mm/s. Thereafter, air drying (drying temperature 45° C.) was performed for 5 minutes to form an iron thin film (catalyst layer) of 3 nm in thickness.

In this manner, a catalyst substrate 1, which had the alumina thin film and the iron thin film on the substrate in this order, was obtained.

The prepared catalyst substrate 1 was loaded into a reaction furnace of a CVD device maintained at a furnace internal temperature of 750° C. and a furnace internal pressure of $1.02\times10^5$ Pa, and a mixed gas of 100 sccm of He and 800 sccm of $H_2$ was introduced into the reaction furnace for 10 minutes (formation step). Next, a mixed gas of 850 sccm of He, 100 sccm of ethylene, and 50 sccm of $H_2O$-containing He (relative humidity 23%) was supplied into the reaction furnace for 8 minutes (growth step), while the furnace internal temperature of 750° C. and the furnace internal pressure of $1.02\times10^5$ Pa were maintained.

Thereafter, 1,000 sccm of He was supplied into the reaction furnace in order to purge residual feedstock gas and catalyst activating material. By the above processes, an aligned fibrous carbon nanostructure aggregate 1 was obtained. The aligned fibrous carbon nanostructure aggregate 1 that was obtained had a yield of 1.8 mg/cm², a G/D ratio of 3.7, a density of 0.03 g/cm³, a BET specific surface area of 1,060 m²/g, and a carbon purity of 99.9%. The aligned fibrous carbon nanostructure aggregate 1 that had been prepared was peeled from the catalyst substrate 1 to obtain fibrous carbon nanostructures.

<Preparation of Fibrous Carbon Nanostructure Dispersion Liquid 1>

The previously described fibrous carbon nanostructures were added in an amount of 1.0 g to 500 mL of 2 mass % sodium deoxycholate (DOC) aqueous solution, used as a dispersant-containing solvent, to obtain a coarse dispersion liquid containing DOC as a dispersant. The coarse dispersion liquid containing the fibrous carbon nanostructures was loaded into a high-pressure homogenizer (trade name BERYU SYSTEM PRO, available from Beryu Corp.) having a multi-step pressure control device (multi-step pressure reducer) configured to apply back pressure during dispersion, and the coarse dispersion liquid was subjected to dispersion treatment at a pressure of 100 MPa. In detail, the fibrous carbon nanostructures were dispersed by imparting shear force on the coarse dispersion liquid while applying back pressure and, as a result, a fibrous carbon nanostructure dispersion liquid 1 was obtained as the fibrous carbon nanostructure dispersion liquid. Additionally, in the dispersion treatment, dispersion liquid flowing out from the high-pressure homogenizer was returned to the high-pressure homogenizer, and dispersion treatment was carried out in this manner for 10 minutes.

<Preparation of Fibrous Carbon Nanostructure Dispersion Liquid 2>

A fibrous carbon nanostructure dispersion liquid 2 was obtained by the same procedure with the exception that the fibrous carbon nanostructures used in the fibrous carbon nanostructure dispersion liquid 1 were replaced by JC142 (BET specific surface area 650 m²/g, G/D ratio 0.6, carbon purity 99.1%) available from JEIO Co., Ltd.

Preparation of Comparative Example Dispersion Liquid

A comparative example dispersion liquid was obtained by the same procedure with the exception that the fibrous carbon nanostructures used in the fibrous carbon nanostructure dispersion liquid 1 were replaced by NC7000 (BET specific surface area 270 m²/g, G/D ratio 0.3, carbon purity 89.1%) available from Nanocyl.

Example 1

Into a 200 mL beaker, 100 g the prepared fibrous carbon nanostructure dispersion liquid 1 and 0.022 g of expanded graphite (trade name "EC500", available from Ito Graphite Co., Ltd.) were placed. Then, filtration was performed at 0.09 MPa by using a vacuum filtration device equipped with a membrane filter. After the end of filtration, isopropyl alcohol and water were passed through the vacuum filtration device to wash a carbon film formed on the membrane filter, and then air was passed through the vacuum filtration device for 15 minutes. After that, the prepared carbon film/membrane filter were immersed in ethanol, and the carbon film was peeled from the membrane filter to obtain a carbon film 1.

The film density of the obtained carbon film 1 was measured to be 0.75 g/cm³. The glossiness of the produced CNT film 1 was measured at 60° using a gloss meter (Gloss Checker available from Horiba, Ltd., wavelength 890 nm). The measured glossiness was 25. Surface resistivity of the produced carbon film 1 was measured by the four-terminal four-probe method using a conductivity meter Loresta® GP (Loresta is a registered trademark in Japan, other countries, or both), available from Mitsubishi Chemical Corporation. The measured surface resistance was 2.3 Ω/sq.

The carbon film 1 had a circular shape having a diameter of 50 mm, an area of approximately 20 cm², and a thickness of 20 μm, which correspond to the dimension of the membrane filter. The carbon film 1 had excellent film-forming properties, maintained the film form even after being peeled from the filter, and also had excellent free-standing properties.

Example 2

A carbon film 2 was formed by the same procedure as in Example 1 with the exception that the amount of expanded graphite (trade name "EC500", available from Ito Graphite Co., Ltd.) used in Example 1 was changed to 0.050 g. The film density of the obtained carbon film 2 was measured to be 0.68 g/cm³. Furthermore, for the produced carbon film 2, the glossiness at 60° was measured to be 18, and the surface resistivity was measured to be 2.4 Ω/sq.

Similarly to the carbon film 1, the obtained carbon film 2 had substantially the same dimension as the membrane filter, had excellent film-forming properties, maintained the film form even after being peeled from the filter, and also had excellent free-standing properties.

Example 3

A carbon film 3 was formed by the same procedure as in Example 1 with the exception that the amount of expanded graphite (trade name "EC500", available from Ito Graphite Co., Ltd.) used in Example 1 was changed to 0.133 g. The film density of the obtained carbon film 3 was measured to be 0.62 g/cm³. Furthermore, for the produced carbon film 3, the glossiness at 60° was measured to be 8, and the surface resistivity was measured to be 3.3 Ω/sq.

Similarly to the carbon film 1, the obtained carbon film 3 had substantially the same dimension as the membrane filter, had excellent film-forming properties, maintained the film form even after being peeled from the filter, and also had excellent free-standing properties.

Example 4

A carbon film 4 was formed by the same procedure as in Example 1 with the exception that expanded graphite (trade name "EC500", available from Ito Graphite Co., Ltd.) was replaced by carbon black (trade name "TOKABLACK #4300", available from Tokai Carbon Co., Ltd.) and the blended amount was also changed to 0.300 g. The film density of the obtained carbon film 4 was measured to be 0.78 g/cm$^3$. Furthermore, for the produced carbon film 4, the glossiness at 60° was measured to be 12, and the surface resistivity was measured to be 2.8 Ω/sq.

Similarly to the carbon film 1, the obtained carbon film 4 had substantially the same dimension as the membrane filter, had excellent film-forming properties, maintained the film form even after being peeled from the filter, and also had excellent free-standing properties.

Example 5

A carbon film 5 was formed by the same procedure as in Example 1 with the exception that the fibrous carbon nanostructure dispersion liquid 1 (also referred to as "CNT dispersion liquid 1"), which was used in Example 1, was replaced by the fibrous carbon nanostructure dispersion liquid 2 (also referred to as "CNT dispersion liquid 2"). The film density of the obtained carbon film 5 was measured to be 0.64 g/cm$^3$. Furthermore, for the produced carbon film 5, the glossiness at 60° was measured to be 12, and the surface resistivity was measured to be 3.4 Ω/sq.

Similarly to the carbon film 1, the obtained carbon film 5 had substantially the same dimension as the membrane filter, had excellent film-forming properties, maintained the film form even after being peeled from the filter, and also had excellent free-standing properties.

Example 6

A carbon film 6 was formed by the same procedure as in Example 1 with the exception that the amount of expanded graphite (trade name "EC500", available from Ito Graphite Co., Ltd.) used in Example 1 was changed to 0.467 g. The film density of the obtained carbon film 6 was measured to be 0.42 g/cm$^3$. Furthermore, for the produced carbon film 6, the glossiness at 60° was measured to be 3, and the surface resistivity was measured to be 4.0 Ω/sq.

Although the obtained carbon film 6 maintained the film form even after being peeled from the filter and also had excellent free-standing properties, film contraction was observed.

Comparative Example 1

A comparative example carbon film 1 was formed by the same procedure with the exception that the fibrous carbon nanostructure dispersion liquid 1, which was used in Example 1, was replaced by the comparative example dispersion liquid.

In the obtained comparative example carbon film 1, significant film contraction was observed, and significant cracking was observed in the film formed on the membrane filter, and free-standing properties were not observed. It was impossible to evaluate the comparative example carbon film 1.

Table 1 below depicts results of Examples and Comparative Example described above. Regarding film-forming properties of each of the obtained carbon films, after the carbon film was peeled from the membrane filter, when the carbon film maintained the film form having substantially the same dimension as the membrane filter, the film-forming properties were evaluated as A (excellent), when more or less contraction to a practically harmless degree was confirmed, the film-forming properties were evaluated as B (good), and when cracking was confirmed, the film-forming properties were evaluated as C (failure). Free-standing properties of each of the obtained carbon films were evaluated as A (good) when free-standing properties were confirmed and were evaluated as B (failure) when free-standing properties were not confirmed. Additionally, evaluation and measurement were not possible for some categories, which are indicated by - (hyphens).

TABLE 1

| | | Example 1 | Example 2 | Example 3 | Example 4 | Example 5 | Example 6 | Comparative Example 1 |
|---|---|---|---|---|---|---|---|---|
| Fibrous carbon nanostructures | Blended amount [g] | 0.2 | 0.2 | 0.2 | 0.2 | 0.2 | 0.2 | 0.2 |
| | BET specific surface area [m$^2$/g] | 1060 | 1060 | 1060 | 1060 | 650 | 1060 | 270 |
| Conductive carbon | Type | Expanded graphite | Expanded graphite | Expanded graphite | Carbon black | Expanded graphite | Expanded graphite | Expanded graphite |
| | Blended amount [g] | 0.022 | 0.050 | 0.133 | 0.300 | 0.022 | 0.467 | 0.022 |
| Fibrous carbon nanostructures/ Conductive carbon [mass ratio] | | 90/10 | 80/20 | 60/40 | 40/60 | 90/10 | 30/70 | 90/10 |
| Carbon film characteristics | Film-forming properties | A | A | A | A | A | B | C |
| | Free-standing properties | A | A | A | A | A | A | B |
| | Surface resistivity [Ω/sq.] | 2.3 | 2.4 | 3.3 | 2.8 | 3.4 | 4.0 | — |
| | Glossiness | 25 | 18 | 8 | 12 | 12 | 3 | — |
| | Film density [g/cm$^3$] | 0.75 | 0.68 | 0.62 | 0.78 | 0.64 | 0.42 | — |

As seen from Table 1, the carbon films according to Examples, which include other components than fibrous nanostructures such as CNTs, have excellent free-standing properties and electrical conductivity.

INDUSTRIAL APPLICABILITY

The present disclosure provides a carbon film that has excellent free-standing properties and electrical conductivity and a method of producing the same.

The invention claimed is:

1. A carbon film, comprising:

a plurality of fibrous carbon nanostructures; and a conductive carbon, wherein the plurality of fibrous carbon nanostructures has a BET specific surface area of 500 $m^2/g$ or more, and the plurality of fibrous carbon nanostructures and the conductive carbon are in contact and are not physically fused.

2. The carbon film according to claim 1, wherein a content ratio by mass of the plurality of fibrous carbon nanostructures to the conductive carbon (fibrous carbon nanostructures/conductive carbon) is from 95/5 to 35/65.

3. The carbon film according to claim 1, wherein the plurality of fibrous carbon nanostructures includes one or more carbon nanotubes.

4. A method of producing a carbon film, the method comprising:

mixing conductive carbon into a fibrous carbon nanostructure dispersion liquid containing a plurality of fibrous carbon nanostructures having a BET specific surface area of 500 $m^2/g$ or more, a dispersant, and a solvent; and subsequently removing the solvent to form a carbon film, wherein the carbon film comprises the plurality of fibrous carbon nanostructures and the conductive carbon which are in contact and are not physically fused.

5. The method according to claim 4, the method further comprising:

preparing the fibrous carbon nanostructure dispersion liquid by subjecting a coarse dispersion liquid containing the plurality of fibrous carbon nanostructures, the dispersant, and the solvent to dispersion treatment that brings about a cavitation effect or a crushing effect in order to disperse the fibrous carbon nanostructures.

6. The method according to claim 4, wherein a content ratio by mass of the plurality of fibrous carbon nanostructures to the conductive carbon (fibrous carbon nanostructures/conductive carbon) in the fibrous carbon nanostructure dispersion liquid is from 95/5 to 35/65.

7. The method according to claim 4, wherein the plurality of fibrous carbon nanostructures includes one or more carbon nanotubes.

* * * * *